United States Patent [19]

Larsson

[11] 4,041,744
[45] Aug. 16, 1977

[54] HIGH PRESSURE PRESS

[75] Inventor: Hans Gunnar Larsson, Vasteras, Sweden

[73] Assignee: ASEA Aktiebolag, Vasteras, Sweden

[21] Appl. No.: 633,842

[22] Filed: Nov. 20, 1975

[30] Foreign Application Priority Data

Dec. 6, 1974 Sweden .............................. 7415295

[51] Int. Cl.² ............................................ B21D 72/10
[52] U.S. Cl. .................................. 72/60; 72/DIG. 31; 72/272
[58] Field of Search .................. 72/272, 63, 60, 56, 72/DIG. 31; 277/188 R, 188 A, 58

[56] References Cited

U.S. PATENT DOCUMENTS

| 3,126,096 | 3/1964 | Gerard | 72/DIG. 31 |
| 3,392,562 | 7/1968 | Fuchs, Jr. | 72/60 |
| 3,707,864 | 1/1973 | Pigett et al. | 72/272 |
| 3,914,981 | 10/1975 | Nilsson et al. | 72/60 |
| 3,934,442 | 1/1976 | Larker et al. | 72/DIG. 31 |

FOREIGN PATENT DOCUMENTS 1,170,931  11/1969  United Kingdom ................ 72/60

Primary Examiner—Leon Gilden
Attorney, Agent, or Firm—Watson, Cole, Grindle & Watson

[57] ABSTRACT

A press for hydrostatic extrusion includes a pressure chamber for enclosing a pressure medium which is formed of a high pressure cylinder, a pressure generating piston, a die and a die support and seals. The die support includes an exchangeable support ring which engages the end surface of the liner and bridges the gap between the liner and the die. A metallic sealing ring is arranged within the liner in engagement therewith, forming a gap between the inner surface of the sealing ring and the outer surface of the die or die support. The die support has a groove in its upper surface which contains a sealing member against which the edge of the metallic sealing ring engages. The lower outer corner of the metallic sealing ring is bevelled to form a space which communicates with the outside of the press.

2 Claims, 4 Drawing Figures

HIGH PRESSURE PRESS

BACKGROUND OF THE INVENTION

1. Field of the Invention

The invention relates to presses for hydrostatic extrusion with a die support and particularly to sealing such presses at the die end.

In presses for hydrostatic extrusion very high pressure levels are used; usually the working pressure is between 10 and 20 kbar. At this high pressure a reliable seal must be achieved between the inner wall of a press cylinder and a die or a die support and between the inner wall of the cylinder and a punch projecting into the cylinder, said punch or piston, when being inserted into the cylinder, producing the high extrusion pressure in a pressure medium which is enclosed in a pressure chamber formed of the cylinder, the die and the piston. A billet to be extruded is located in the pressure chamber and is pressed out through the die under the effect of a pressure medium. On raising the pressure from atmospheric level to the extrusion level, the inner diameter of the cylinder increases by 0.5 to 1%, which requires a seal to prevent pressure medium from flowing out through a gap between the cylindrical wall and the piston and the die, respectively, which expands upon a pressure increase. Any leakage at the high pressures mentioned may involve severe damage to the die or the die support, which requires an exchange of these expensive parts.

2. The Prior Art

In U.S. Pat. No. 3,702,555 there is shown and described in more detail a press of the kind referred to in this invention. Larker application Ser. No. 462,402, filed Apr. 19, 1974 and U.S. Pat. Nos. 3,865,387 and 3,877,707 show different variations of high pressure seals for presses for hydrostatic extrusion, having a first sealing ring abutting the cylindrical wall and a seal holder and a second sealing ring sealing against a die or piston and a seal holder. These seals have provided great improvement and have resulted in a great increase in the service life. However, certain drawbacks have remained.

In some cases leakage has occurred between the metallic sealing rings hitherto used and a cooperating sealing surface on a seal holder. Leaking pressure medium causes surface damage, which means that sealing will not be obtained during a subsequent pressing. O-rings providing initial sealing upon a pressure increase in the pressure chamber will improve the seal. At the high pressures used, rubber and plastic rings will become brittle and will easily break, and therefore a good, pure metallic seal is always advantageous. In hot extrusion the seal is also heated by the billet which has been heated to 600° C, which increases the strain further. In addition, the viscosity of the pressure medium is reduced, which also increases the problems of sealing.

SUMMARY OF THE INVENTION

The present invention relates to a method of constructing the sealing ring so that the sealing capacity increases. The invention is applicable in hot extrusion presses for pressing heated billets, as well as for presses for pressing billets which are at normal room temperature when being inserted.

According to the invention, the end surface of the sealing ring — which end surface faces a cooperating sealing surface — is made with a bevel or with grooves communicating with the surrounding atmosphere. The pressure medium, acting on the portion of the part of the ring located in the pressure chamber, which portion lies inside the bevel or the groove, will then result in an increase of the contact pressure of the end surface of the ring which abuts the support. The pressure medium also acts on the part of the inner surface of the ring which lies inside the sealing surface. The fact that the contact surface exceeds the pressure of the pressure medium will improve the sealing ability.

BRIEF DESCRIPTION OF THE DRAWINGS

The invention is described in more detail with reference to the accompanying drawings.

DESCRIPTION OF THE PREFERRED EMBODIMENTS

Figure 1:
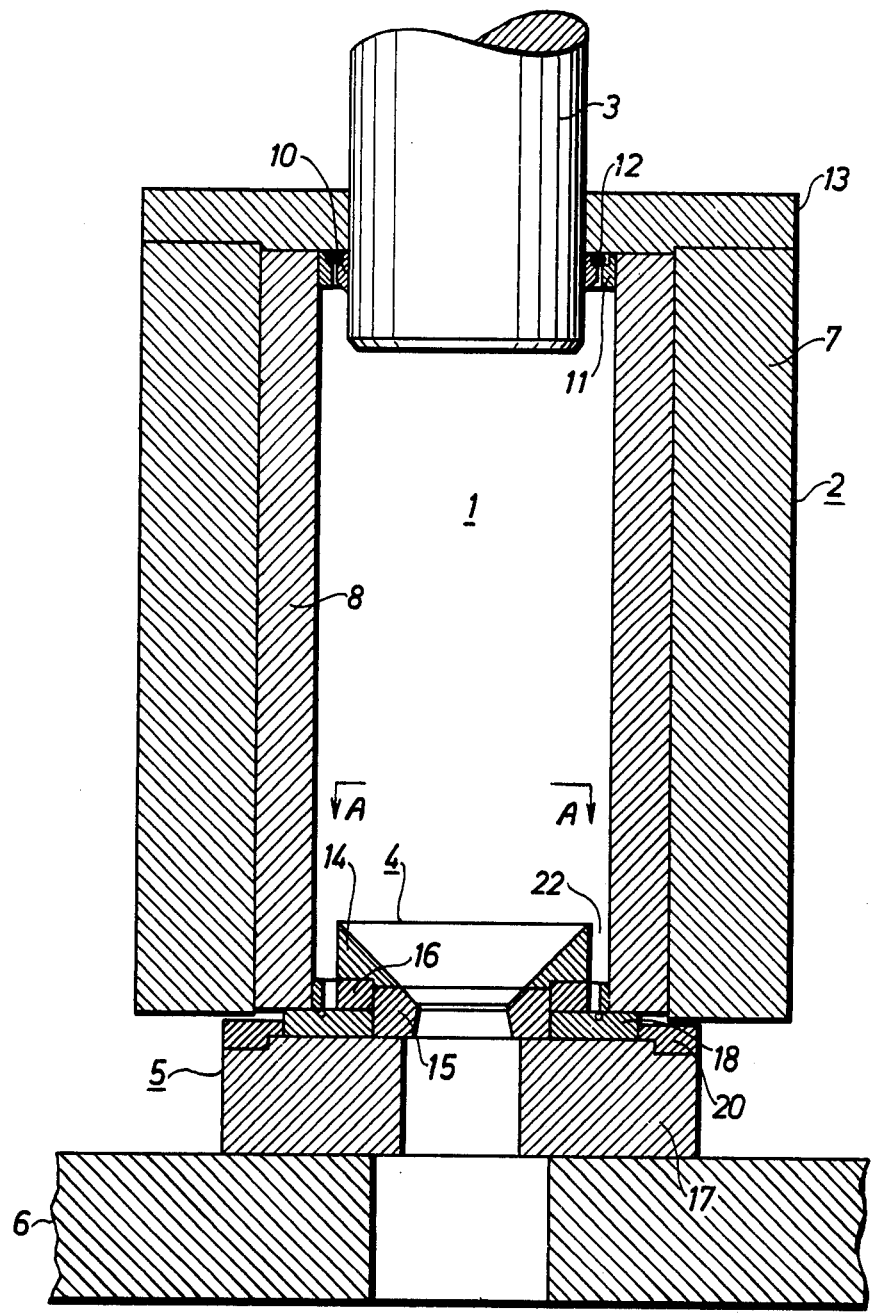
FIG. 1 shows schematically a pressure chamber in a hydrostatic extrusion press.
Figure 2:
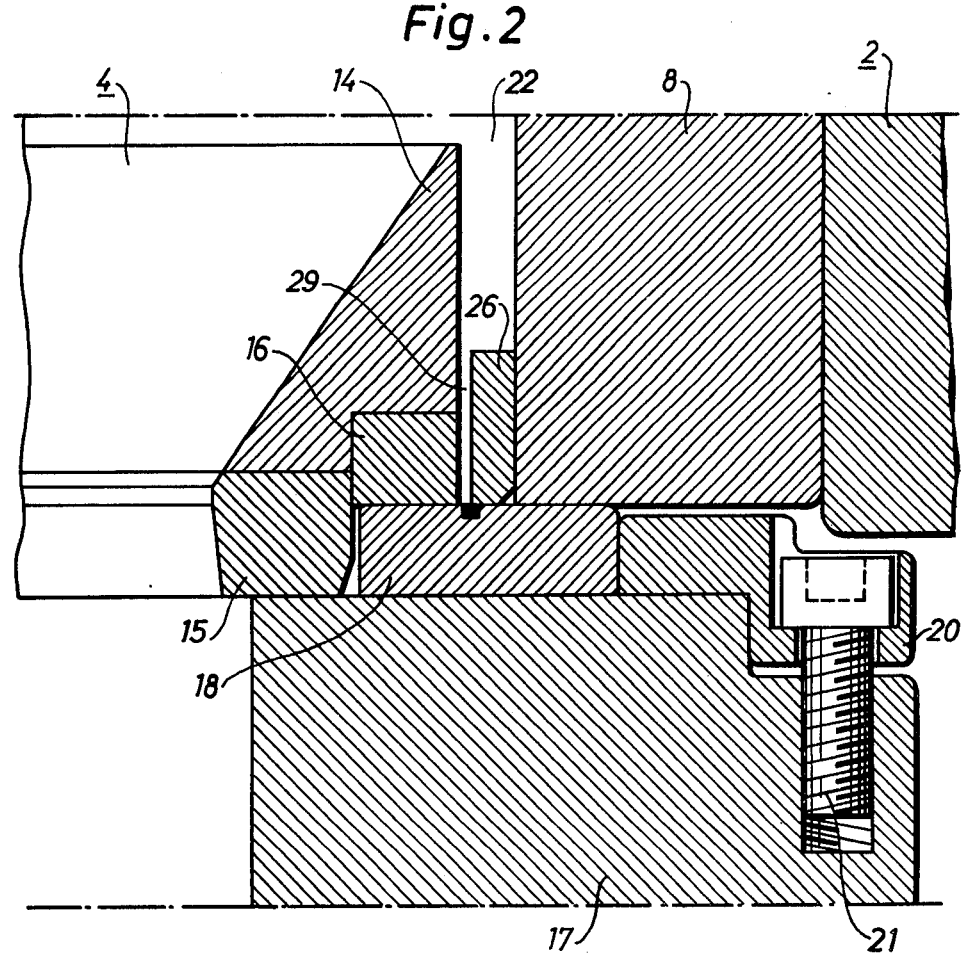
FIG. 2 shows on a larger scale the encircled portion in FIG. 1.
Figure 3:
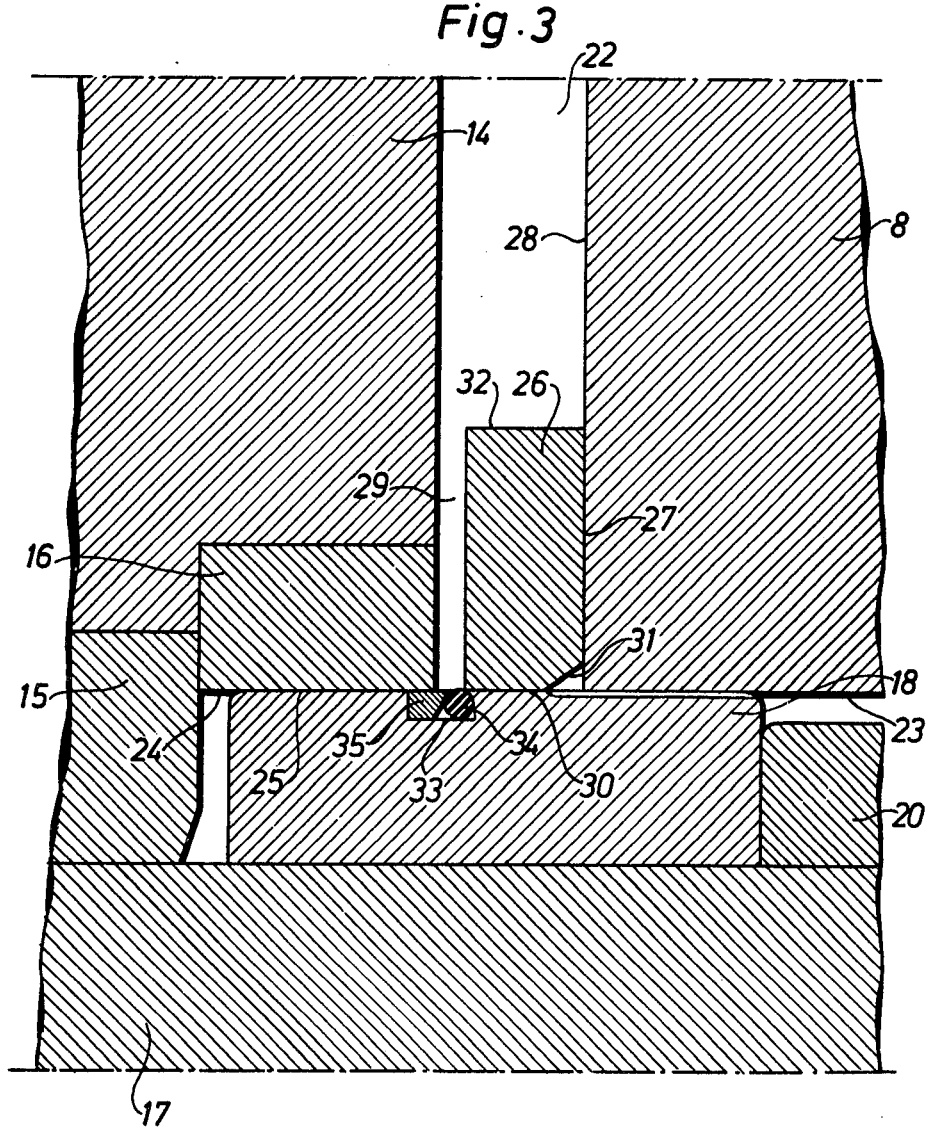
FIG. 3 shows on a still larger scale the die support and the seal at the die end of the pressure chamber and FIG. 4 shows a plan view of the press illustrating the configuration of the various elements.
Figure 4:
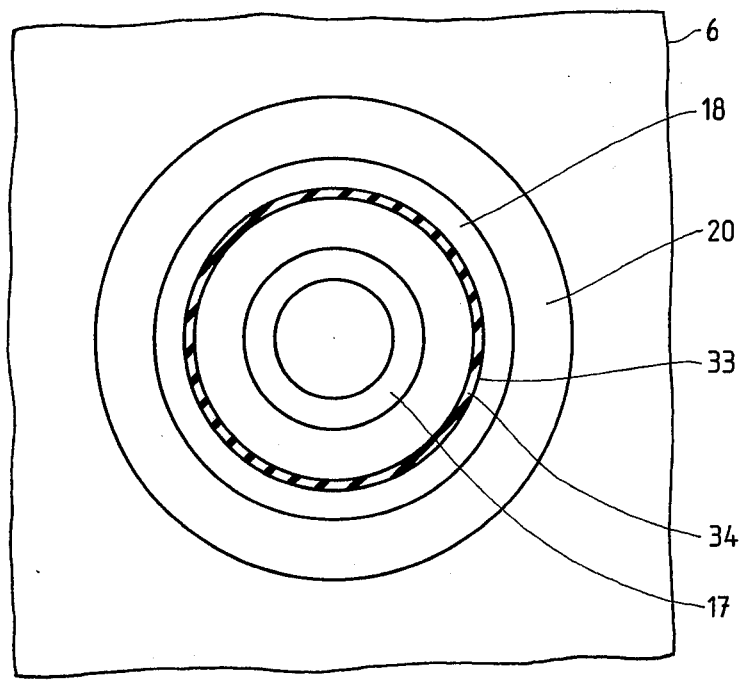

In the figures, 1 designates a press chamber which is formed of a high pressure cylinder 2, a pressure generating piston 3, a die 4 and a die support 5 resting against a yoke 6 in a press, the rest of which is not shown. The high pressure cylinder 2 comprises a cylinder 7, which may be built up in a manner known per se of a tube and prestressed wires or strips wound around said tube, and a liner 8 inserted in the cylinder 7. Between the piston 3 and the liner 8 there is a seal consisting of two metal rings 10 and 11 and an O-ring 12. The end piece 13 of the cylinder 2 also forms a support for the seal. The die 4 consists of a preforming part 14 and an end forming and calibrating part 15 and of a suitably prestressed ring 16 holding said two parts 14 and 15 together. The die support 5 comprises a strong annular part 17, an exchangeable support ring 18 and an attachment ring 20 arranged around said support ring 18 in a prestressed manner, said ring 20 being joined to the part 17 by a number of bolts 21.

The ring 18 of the die support bridges the gap 22 between the parts 14 and 16 of the die. The ring 18 is pressed against the end surface 23 of the liner 8. The end surface 24 of the die ring 16 seals against the upper surface 25 of the ring 18. In the gap 22 there is only one single metallic sealing ring 26, as opposed to previously used seals, the outer surfce 27 of which abuts the inner surface 28 of the liner 8 in a sealing manner, since in unloaded condition the ring has a larger diameter than the liner and is prestressed when it is inserted. Between the sealing ring 26 and the die there is a gap 29 completely free of the sealing members used heretofore. The plane end surface 30 of the sealing ring 26 makes contact with the upper surface 25 of the support ring 18 of the die. At one corner the sealing ring 26 is made with a bevel 31. The ring-shaped space formed by the bevel 31 should be ventilated towards the atomsphere. The pressure acting on the end surface 32 above the bevel 31 will be distributed along the plane end surface 30 of the ring 26, by which means the contact pressure between surfaces 30 and 25 will exceed the fluid pressure inside the high pressure chamber 1, thus obtaining good sealing. In the ring 18 there is an annular groove 33, in which there is a sealing ring 34 which provides initial sealing between the ring 18 and the ring 26. The sealing ring 34 can be fixed in the groove by a locking ring 35 with an oblique outer side surface. The sealing ring 34 may be a so-called O-ring, but another shape which also provides initial sealing between the die ring 16 and the support ring 18 may be used.

I claim:

1. Press for hydrostatic extrusion comprising a pressure chamber adapted for enclosing a pressure medium, said pressure chamber including from a high pressure cylinder, a piston movable into the cylinder at one end for effecting a pressurization of an enclosed pressure medium, a die and a die support at the other end of the cylinder, and sealing means for preventing the pressure medium from escaping between the cylinder and the piston and the die and die support at the ends thereof, in which there is a metallic sealing ring in the high pressure cylinder having an outer cylindrical surface in contact with the inner wall of the cylinder by the pressure medium and an outer end surface engaging a support member, the outer end surface of the sealing ring having a recessed portion forming together with the supporting member or together with the supporting member and the cylinder an annular space, said space communicating with the surrounding atmosphere through a groove or channel in the support member or the cylinder, whereby the contact pressure between the outer end surface of the ring and the supporting member thus exceeds the pressure of the pressure medium in the pressure chamber.

2. Press according to claim 1, in which the corner formed by the outer cylindrical surface and the outer end surface of the sealing ring is bevelled to form the annular space.

* * * * *